US008128990B2

(12) United States Patent
Diggins

(10) Patent No.: US 8,128,990 B2
(45) Date of Patent: Mar. 6, 2012

(54) ABRASION RESISTANT COATING COMPOSITION

(75) Inventor: David Robert Diggins, Flagstaff Hill (AU)

(73) Assignee: Carl Zeiss Vision Australia Holdings Ltd., Lonsdale (AU)

( * ) Notice: Subject to any disclaimer, the term of this patent is extended or adjusted under 35 U.S.C. 154(b) by 812 days.

(21) Appl. No.: 10/498,925

(22) PCT Filed: Dec. 13, 2002

(86) PCT No.: PCT/AU02/01689
§ 371 (c)(1), (2), (4) Date: Mar. 18, 2005

(87) PCT Pub. No.: WO03/052011
PCT Pub. Date: Jun. 26, 2003

(65) Prior Publication Data
US 2005/0171231 A1 Aug. 4, 2005

(30) Foreign Application Priority Data
Dec. 14, 2001 (AU) .................................... PR9490

(51) Int. Cl.
*B05D 5/06* (2006.01)
(52) U.S. Cl. ...... 427/162; 526/264; 526/301; 526/323.2; 522/116; 427/2.1; 427/2.31; 427/133; 427/430.1
(58) Field of Classification Search .................. 526/301, 526/264; 522/16, 96, 75, 74; 264/1.4; 428/352; 350/167
See application file for complete search history.

(56) References Cited

U.S. PATENT DOCUMENTS

| 4,198,465 | A | | 4/1980 | Moore et al. |
| 4,774,035 | A | * | 9/1988 | Carmelite et al. ........... 264/1.38 |
| 4,912,185 | A | * | 3/1990 | Toh ................................ 526/301 |
| 4,929,506 | A | | 5/1990 | Kerr, III et al. |
| 4,954,591 | A | * | 9/1990 | Belmares ...................... 526/264 |
| 4,986,633 | A | * | 1/1991 | Ohta ............................. 359/642 |
| 5,246,131 | A | * | 9/1993 | Shaw et al. ................... 220/264 |
| 5,246,728 | A | | 9/1993 | Rodriquez |
| 5,426,131 | A | | 6/1995 | Katsamberis |
| 5,478,869 | A | | 12/1995 | Takahashi et al. |
| 5,804,301 | A | | 9/1998 | Curatolo |
| 5,882,556 | A | | 3/1999 | Perrott et al. |
| 5,949,518 | A | | 9/1999 | Belmares et al. |
| 5,959,761 | A | | 9/1999 | Perrott et al. |
| 6,087,413 | A | | 7/2000 | Lake |
| 6,420,451 | B1 | | 7/2002 | Lin et al. |
| 6,551,710 | B1 | | 4/2003 | Chen et al. |
| 6,793,339 | B1 | | 9/2004 | Yip et al. |
| 2004/0096576 | A1 | | 5/2004 | Chen |

FOREIGN PATENT DOCUMENTS

EP 0 505 737 9/1992
EP 0505737 9/1992

OTHER PUBLICATIONS

Australian Office Action dated Feb. 8, 2007.
European Office Action dated Oct. 18, 2007.

* cited by examiner

*Primary Examiner* — David Turocy
*Assistant Examiner* — Andrew Bowman
(74) *Attorney, Agent, or Firm* — Buchanan Ingersoll & Rooney, PC

(57) ABSTRACT

The invention provides a coating composition for an optical element, such as an ophthalmic lens. The coating composition includes a relatively rigid multifunctional monomer and a relatively flexible difunctional monomer. The rigid multifunctional monomer and the flexible difunctional monomer are capable of co-reacting to form an abrasion resistant coating on the optical element. The invention also provides a method of forming an abrasion resistant coating on an optical element, such as an ophthalmic lens. The method includes the steps of coating the optical element with a relatively rigid multifunctional monomer and a relatively flexible difunctional monomer, and polymerising the coating to form an abrasion resistant coating on the optical element.

12 Claims, No Drawings

ABRASION RESISTANT COATING COMPOSITION

This application claims priority to PCT Application No. PCT/AU02/01689, filed on Dec. 13, 2002, now International Publication No. WO 03/052011 A1, published Jun. 26, 2003, which claims priority to Australian Patent No. PR 9490, filed Dec. 14, 2001.

FIELD OF THE INVENTION

The present invention relates to compositions for use in forming abrasion resistant coatings on optical elements, to methods of coating optical elements with the composition and to optical elements coated with the coating composition of the invention.

In one particular example, the composition and method are suitable for forming an abrasion resistant coating (a so called 'hard coating') on an ophthalmic lens.

BACKGROUND OF THE INVENTION

The development of optical elements, including ophthalmic lenses, sunglass lenses and other optical lenses, which are manufactured from plastic materials has also lead to the development of a variety of coatings for use on the optical elements. For example, coatings that provide an increase in abrasion resistance or a decrease in the amount of reflected light have been developed.

Commonly, thermoset plastic materials such as CR-39, Finalite (a registered trademark of Sola International Inc.) and Spectralite (a registered trademark of Sola International Inc.) are used in the manufacture of optical elements such as ophthalmic lenses. A common thermoplastic material that is used in the manufacture of optical elements is the polycarbonate of bisphenol A. Other plastics that have also been used include a variety of commercial thiourethane materials. However it has been found that, in use, ophthalmic lenses and other optical elements formed from these plastics tend to be more easily scratched or abraded on external surfaces than the more traditional glass counterparts.

To overcome this problem, abrasion resistant coatings for plastic optical elements have been developed. Usually, a coating material (typically a monomer) is coated onto outer surfaces of the optical element and the monomeric coating material is then cured to form a coating that is more resistant to abrasion than the plastic material from which the optical element is formed. This practice is commonly referred to as the 'hard coating' of a lens.

With many hard coating processes a primer coating is sometimes required to provide sufficient adhesion of the coating to the optical element and this contributes to the cost of manufacture. Alternatively, primerless coatings are available however they typically do not provide a sufficient level of abrasion resistance.

In order to overcome some of the manufacturing costs associated with hard coating an uncoated optical element the process of in-mould coating has been developed. In-mould coating involves coating an inner mould surface with a coating composition prior to casting or moulding an optical element. Unfortunately, in most cases the materials used to form coatings in these processes do not provide a sufficient level of abrasion resistance.

The present invention aims to provide a coating composition and a method of coating an optical element, such as an ophthalmic lens, that ameliorates any one or more of the problems with existing abrasion resistant coatings and techniques for forming abrasion resistant coatings on optical elements. Alternatively, the present invention aims to provide an alternative to existing abrasion resistant coatings and techniques for forming abrasion resistant coatings on optical elements.

SUMMARY OF THE INVENTION

The present invention provides a coating composition for an optical element, the composition including a relatively rigid multifunctional monomer and a relatively flexible difunctional monomer, wherein the rigid multifunctional monomer and the flexible difunctional monomer are capable of co-reacting to form an abrasion resistant coating on the optical element.

The present invention also provides a method of forming an abrasion resistant coating on an optical element, the method including the steps of coating the optical element with the composition of the present invention, and polymerising the coating to form an abrasion resistant coating on the optical element.

As used herein the term 'optical element' is to be taken to include lenses such as ophthalmic lenses, camera lenses, instrument lenses, or any other optically transparent material such as windows, transparent display panels and the like.

The step of 'coating the optical element' may involve applying the coating composition to a preformed optical substrate or it may involve applying the coating during the formation of the optical substrate, such as in an in-mould coating process.

Further, the present invention provides an optical element that is coated with the coating composition of the invention. The optical element may also be coated using the method of the invention.

In one particularly preferred form of the present invention the optical element is an ophthalmic lens.

The optical element may be coated with the coating composition using any of the techniques that are used for that purpose in the art, including dip coating, spin coating, flow coating, spray coating and in-mould coating. In one preferred form of the invention, the composition is used in an in-mould coating process.

The optical elements that may be coated with the coating composition include those formed from a polymer of diethylene glycol bis(allyl carbonate) such as CR-39™ (a trade mark of PPG Industries, Inc), an acrylate polymer such as Spectralite™ (trade mark of Sola International Inc.), a thiolene polymer such as Finalite™ (trade mark of Sola International Inc.), thiourethane polymers or a polycarbonate polymer of bisphenol A. In mould coating may be the preferred method of applying the coating in the case of thermoset materials such as Spectralite or Finalite, whereas dip coating, spin coating, flow coating or spray coating may be most appropriate for polycarbonate optical elements.

The term "flexible difunctional monomer" means a monomer having at least two functional groups joined by a relatively flexible backbone that yields a polymer having a glass transition temperature of less than about 40° C. when homopolymerised.

In one preferred form, the flexible difunctional monomer has a carbon and/or heteroatom based backbone. Suitably flexible backbones include those that contain aliphatic carbon and/or heteroatom based chains. A backbone consisting of a polyoxyalkylene chain is preferred, as apart from providing a flexible chain, the polyoxyalkylene chain is more inherently abrasion resistant than an aliphatic chain without a heteroatom. Furthermore, a backbone consisting of polyoxyethylene chains is especially preferred as they are even more inherently abrasion resistant than aliphatic chains without a heteroatom. The functional groups may be bonded to the backbone either directly or indirectly. Preferably, two functional groups are bonded directly to the backbone. Additionally, different functional groups may be incorporated within a single monomer molecule.

Preferably, the flexible difunctional monomer contains two functional groups bonded to the relatively flexible backbone. Most preferably, the functional groups are acrylate or methacrylate.

By way of example, suitable flexible difunctional monomers may be selected from the list including alkylene diacrylates, such as hexane diol acrylate; poly(alkyleneoxide) diacrylates such as polyethylene glycol 200 diacrylate, polyethylene glycol 400 diacrylate, polyethylene glycol 600 diacrylate, tripropylene glycol diacrylate and polypropylene glycol 400 diacrylate; poly(alkyleneoxide) dimethacrylates such as polyethylene glycol 200 dimethacrylate, polyethylene glycol 400 dimethacrylate and polyethylene glycol 600 dimethacrylate. Particularly preferred flexible difunctional monomers are polyethylene glycol 400 diacrylate, polyethylene glycol 600 diacrylate, polyethylene glycol 400 dimethacrylate and polyethylene glycol 600 dimethacrylate. The flexible difunctional monomer may also be a mixture of any two or more of the listed difunctional monomers.

The term "rigid multifunctional monomer" means a monomer having two or more functional groups bonded to a relatively rigid backbone which yields a polymer having a glass transition temperature of greater than about 130° C. when homopolymerised.

The rigid multifunctional monomer is preferably an organic molecule having a carbon based backbone. Suitably rigid backbones include those that contain ring moieties such as 5, 6 and 7 membered aromatic or aliphatic cyclic or heterocyclic rings. The functional group may be bonded to the backbone either directly or indirectly. Additionally, different functional groups may be incorporated within a single monomer molecule.

Preferably, the rigid multifunctional monomer contains three or more functional groups bonded to the relatively rigid backbone. Most preferably, the functional groups are acrylate or methacrylate.

By way of example, suitable rigid multifunctional monomers may be selected from the list including pentaerythritol tetraacrylate, tris(2-hydroxyethyl)isocyanurate triacrylate, trimethylol propyl triacrylate, dipentaerythritol hexaacrylate, dipentaerythritol pentaacrylate, 2,2,4,4,6,6-hexahydro-2,2,4,4,6,6-hexakis(2-((2-methyl-1-oxo-2-propenyl)oxy)ethoxy)-1,3,5,2,4,6-triazatriphosphorine, U6HA (hexafunctional urethane (meth)acrylate), U4HA (tetrafunctional urethane (meth)acrylate), tricyclodecane dimethanol diacrylate and tris(2-hydroxyethyl)isocyanurate diacrylate. Particularly preferred rigid multifunctional monomers are pentaerythritol tetraacrylate, tris(2-hydroxyethyl)isocyanurate triacrylate, dipentaerythritol hexaacrylate and U6HA. The rigid multifunctional monomer may also be a mixture of any two or more of the listed monomers.

The ratio of rigid multifunctional monomer to flexible difunctional monomer in the composition can be varied, depending on the material of the optical element, the presence or absence of other additives in the composition, and the desired balance between the Bayer abrasion resistance and steel wool resistance of the coating (Bayer abrasion resistance and steel wool abrasion resistance are two standard ophthalmic industry tests for abrasion resistance). Accordingly, the ratio of rigid multifunctional monomer to flexible difunctional monomer can be adjusted so that the level of Bayer or steel wool abrasion resistance can be adjusted and optionally either the Bayer or steel wool abrasion resistance of the coating can be selectively promoted. Additionally, the ratio of rigid multifunctional monomer to flexible difunctional monomer can be adjusted so that the composition, and ultimately the abrasion resistant coating formed, can include additives such as hardness enhancers.

The ratios of rigid multifunctional monomer to flexible difunctional monomer that can be used are able to be determined empirically. The composition may typically contain rigid multifunctional monomer and flexible difunctional monomer in a ratio of between 1:19 to 1:1 (w/w), inclusive.

The composition may be in the form of neat monomers or monomers dissolved in a suitable solvent so that the optical element may be coated with the composition using any of the techniques that are used for that purpose in the art, including dip coating, spin coating, flow coating, spray coating and in-mould coating. In one preferred form of the invention, the composition is used in an in-mould coating process.

Depending on the use of the optical element, all or part of any of the surface(s) of the element may be coated. For example, optical lenses for use in an optical instrument may only have one lens surface exposed and therefore it may only be necessary to coat the exposed surface. In contrast, ophthalmic lenses for use in spectacles have front and back surfaces that are exposed and susceptible to abrasion and therefore it may be preferred that both surfaces are coated. Alternatively, with a semifinished ophthalmic lens only one surface may be coated with the composition of the present invention and the other surface may be coated with a conventional coating after that surface has been generated to the appropriate surface power.

After the optical element has been coated, the coating composition can be cured by polymerisation to form the polymeric abrasion resistant coating. Under suitable polymerisation conditions the functional groups of the rigid multifunctional monomer and the flexible difunctional monomer are preferably capable of reacting with one another so that co-reaction occurs to form a copolymer. Preferably, the functional groups contain an alkene moiety that is able to undergo free radical polymerisation. Most preferably the functional groups are acrylates or methacrylates. Polymerisation may be initiated using suitable polymerisation initiators, including any of the suitable thermal and/or chemical initiators known in the art.

In the case of in-mould coating, a mould surface may be coated with the composition of the present invention, optionally in a solvent, and the composition then polymerised or partially polymerised on the mould prior to the mould being assembled and the optical element cast in the usual manner. In general the solvent evaporates prior to polymerisation but it may or may not be completely removed from the composition prior to polymerisation.

Optical elements that can be coated with the composition of the present invention include ophthalmic lenses, lenses for sunglasses and lenses for optical instruments.

DETAILED DESCRIPTION OF THE INVENTION

As mentioned above, the coating composition of the present invention contains a relatively rigid multifunctional crosslinking monomer and a relatively flexible difunctional monomer. Without being bound by theory, the levels of Bayer and steel wool abrasion resistance that can be achieved with coatings formed from the composition of the present invention is thought to be attributable (at least in part) to the formation of flexible polymer chains interspersed between rigid nodal points (points of crosslinking). Abrasion resistance is thought to be dependent at least to a certain extent upon elasticity that is provided by a flexible polymer having a flexible backbone. It is also thought that very high crosslinking systems provide high levels of steel wool resistance.

Previous attempts to hard coat optical elements by single layer in-mould coating or a radically cured single layer coating that is applied by conventional techniques usually have not provided a coating that is sufficiently resistant to abrasion. In this context, the applicant considers a coating to be of superior abrasion resistance if, using standard ophthalmic industry tests, the coating has at least a 4 star (2.5 times that of uncoated CR-39) ranking in the Bayer abrasion test, or at least a 4 star (2.5 times that of uncoated CR-39) ranking in the standard steel wool abrasion test. For comparative purposes, uncoated CR-39 has a Bayer abrasion resistance and steel wool abrasion resistance ranking of 2. The Bayer and steel wool abrasion resistance rankings are based upon the abrasion resistance of a selected material relative to uncoated CR-39. An abrasion resistance that is less than 0.4 times that of uncoated CR-39 has a star ranking of 0 and an abrasion resistance that is between 0.4 times and equal to that of CR-39 has a star ranking of 1.

In contrast, it has been found that by using the composition of the present invention, it is possible to form a coating that has both a 5 star Bayer (5 times that of uncoated CR-39) and a 5 star (10 times that of uncoated CR-39) steel wool ranking. Additionally, the coating composition of the present invention may be beneficially applied in a single layer to the optical element. Thus, the coatings formed using the composition of the present invention may have a higher level of abrasion resistance than some existing abrasion resistant coatings that have been applied to plastic ophthalmic lenses in a single layer.

In one preferred form of the present invention, the composition is used in an in-mould coating process. In mould coating processes are known in the art—for example see International patent application PCT/AU00/01152, which is incorporated herein by reference solely for the purpose of exemplifying in-mould coating processes.

These processes typically involve coating a mould surface with a coating composition in a suitable solvent, which in this case may be methyl acetate or methylene chloride. The composition may then be partially cured, for example by UV initiated partial polymerisation. The degree of polymerisation may be controlled as described in PCT/AU00/01152. Mould pieces are then fitted together to form a mould cavity that is coated with the composition in a partially polymerised form. Plastics forming monomer is then poured into the mould and the plastic is cured in the usual way. The moulded article is finally removed from the mould to provide the coated article. This then provides an in-mould coating process for forming an optical element that has a level of abrasion resistance that is at least comparable to the abrasion resistance of existing multilayer coatings. However, in this case the coating is formed in a single layer and therefore negates the complexities involved with the formation of multiple layers.

The composition of the present invention may also be used in conventional coating techniques such as dip, spin, flow and spray coating.

In many instances, the composition of the present invention may be applied in a single layer using both conventional and in-mould coating techniques. This negates the problem experienced with some known abrasion resistant coating compositions with which it is necessary to use an intermediary layer to promote adhesion between the abrasion resistant coating and the plastic material of the optical element.

However, in some instances when applying the composition of the present invention to an optical element using conventional coating techniques adhesion promotion to the element may be required. In the case of thermoset plastics such as CR-39, polyacrylates and polythiourethanes, adhesion may need to be effected by surface modification such as through the exposure of the element to chemical species, plasma, UV or corona discharge. In the case of polycarbonate, adhesion may be effected by appropriate choice of solvent. A balance is needed between a solvent system that is too aggressive and causes haze and a solvent system that is not sufficiently aggressive and results in poor adhesion.

For ease of polymerisation, the rigid multifunctional monomer and the flexible difunctional monomer of the composition of the present invention preferably have functional groups with reactive ethylenically unsaturated groups. Suitable reactive ethylenically unsaturated groups include acrylates, methacrylates, acrylic anhydrides, ethylenically unsaturated anhydrides, olefinic compounds, acrylamides, ethylenically unsaturated amides and urethanes, vinyl esters, vinyl ethers, vinyl halides, vinyl epoxy resins, vinyl silanes and siloxanes, vinyl heterocycles, and prepolymers and polymers of these materials. For ease of polymerisation under radical initiation conditions, acrylate, methacrylate and acrylamide functional groups are preferred.

The composition may be polymerised by curing using suitable polymerisation initiators. The initiator may be any of the suitable thermal and/or chemical initiators known in the art. The nature of the initiator utilised in the composition is dependent upon the ethylenically unsaturated material used. For example, for those ethylenically unsaturated materials that undergo free radical polymerisation, suitable initiators are compounds that liberate or generate a free-radical on addition of energy. Such initiators include peroxy, azo, and redox systems each of which are well known and are described in polymerisation art.

Included among the free-radical initiators are the conventional heat activated catalysts such as organic peroxides and organic hydroperoxides. Examples of these catalysts are benzoyl peroxide, tertiary-butyl perbenzoate, cumene hydroperoxide, azobis(isobutyronitrile) and the like.

The preferred catalysts are photopolymerisation initiators. Included among such initiators are acyloin and derivatives thereof, such as benzoin, benzoin methyl ether, benzoin ethyl ether, benzoin isopropyl ether, benzoin isobutyl ether, and alpha-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N, N-dimethyldithiocarbmate; phenones such as acetophenone, alpha.,.alpha.,.alpha.-tribromacetophenone,.alpha.,.alpha.-diethoxyacetophenone, alpha.,.alpha.-dimethoxy-.alpha.-phenylacetophenone, o-nitro-.alpha.,.alpha.,.alpha.-tribromacetophenone, benzophenone, and p,p'-bis(dimethylamino)benzophenone; aromatic iodonium and aromatic sulfonium salts, sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide, and p-acetamidobenzenesulfonyl chloride.

When the composition is to be polymerised using a radical polymerisation initiator such as in a conventional spin or dip coating process, the coating process may be preferred to be conducted in an oxygen depleted environment so as to minimise oxygen inhibition of polymerisation. For example, the coating process may be carried out under a nitrogen blanket. Alternatively, cationic or anionic photoinitiators may be used if oxygen is present in the environment. The amount of polymerisation initiator used and the conditions of polymerisation will be readily determined by those skilled in the art, or can easily be determined empirically.

An advantage of the composition of this invention is that the ratio of rigid multifunctional monomer and flexible difunctional monomer can be varied so that the composition, and ultimately, the abrasion resistant coating formed can be adjusted so that additives such as hardness enhancers may be added to the composition.

Additives that may be added to the composition of the present invention include hardness enhancers, stabilisers, antioxidants, flexibilisers, reinforcing fillers, surfactants, flow agents, levelling agents, refractive index modifiers (e.g. titanium dioxide, zirconium dioxide, antimony dioxide) and antistatic agents.

Hardness enhancers that may be used in the composition of the present invention include colloidal silica. For compatibility reasons (meth)acrylated colloidal silica is preferred but any modified form of colloidal silica that can be dispersed in the monomer solution can be used. The addition of colloidal silica to the composition improves the steel wool abrasion resistance of the coating formed from the composition. Furthermore, the addition of colloidal silica to the composition may be necessary to promote AR coating durability. However, depending upon the dispersant monomer utilised, the addition of colloidal silica (and hence dispersant monomer) can moderate the Bayer abrasion resistance of the coating. For example, if hexane diol diacrylate is used as the dispersant monomer, with high levels of colloidal silica present, a composition will be formed that has a moderate Bayer abrasion. Alternatively, if polyethylene glycol diacrylate (A400) is used as the dispersant monomer, with high levels of colloidal silica present, a composition will be formed that has an excellent Bayer abrasion resistance (depending upon the properties of the rigid multifunctional monomer). Therefore, the level of colloidal silica introduced to the composition depends upon the properties desired. Up to about 50% of the composition may be (meth)acrylated colloidal silica.

As a consequence of colloidal silica being a hardness enhancer, the range of acceptable ratios between rigid and flexible monomers in the composition is dependent upon the level of colloidal silica in the composition. If colloidal silica is not present the range in acceptable ratios is less. With systems with no colloidal silica the range in the ratio of rigid to flexible monomer is 1:7 to 1:3. When the colloidal silica is added to the system, the effective range in the ratio of rigid to flexible monomer increases. At a 30% silica level the effective range is 1:19 to 1:1.

The colloidal silica selected can be made in accordance with the procedures described in U.S. Pat. Nos. 4,348,462 and 5,614,321, both of which are incorporated herein solely for the purpose of providing procedures for preparing colloidal silica. Alternatively, commercial methacrylated silicas are available under the product name of FSD 100 (available from General Electric) or as the product series Highlink (available from Clariant). With these products the methacrylated colloidal silica is dispersed in an acrylate monomer. Hexane diol diacrylate is often used as the dispersant monomer. However, utilising the flexible difunctional monomer as the dispersant monomer is especially preferred. Consequently, difunctional monomers with a flexible polyoxyalkylene backbone are preferred and difunctional monomers with a flexible polyoxyethylene backbone are especially preferred. As the level of methacrylated colloidal silica increases in a composition so does the level of dispersant monomer. The contribution of the dispersant monomer needs to be taken into account when formulating. Furthermore, any increase in the level of silica may also require the adjustment of the ratio of flexible difunctional monomer and rigid multifunctional monomer.

DESCRIPTION OF EXAMPLES OF THE INVENTION

Examples of materials and methods for use with the compositions and methods of the present invention will now be provided. In providing these examples, it is to be understood that the specific nature of the following description is not to limit the generality of the above description.

To determine the level of abrasion resistance of a lens or coating either the steel wool test or Bayer abrasion resistance test can be used.

In the steel wool test standard grade steel wool is rubbed against the substrate at a specified force in a mechanised fashion. The resulting scratching is quantified by measuring haze. An uncoated CR-39 lens is tested under the same conditions and is used as a control. The ratio between the levels of haze developed with the test sample to that of the control lens is determined. This ratio is used as a means to rank abrasion resistance.

To measure Bayer abrasions resistance the Bayer Oscillating Sand test is used. Sample lenses are fixed in position at the bottom of a container, to which is added standard grades of sand. The container is then shaken in an oscillating fashion such that the sand is lifted and dropped upon the lenses. The scratches that are developed on the lens are quantified by the determination of haze. An uncoated CR-39 lens is tested under the same conditions and is used as a control. The ratio between the levels of haze developed with the test sample to that of the control lens is determined. This ratio is used as a means to rank abrasion resistance.

Example 1

70 parts polyethylene glycol 400 diacrylate, 30 parts tris (2-hydroxyethyl)isocyanurate triacrylate, 308 parts of methacrylated colloidal silica dispersed in hexane diol diacrylate (commercially available from General Electric), 26 parts Irgacure 651 (a radical photoinitiator available from Ciba) and 1.6 part BYK 371 (a flow agent available from BYK Chemie) were dissolved in 2413 parts methyl acetate.

This makeup procedure gives the following monomer concentrations (as a percentage of solids):

| | |
|---|---|
| tris(2-hydroxyethyl)isocyanurate triacrylate | 7.5% |
| polyethylene glycol 400 diacrylate | 17.6% |
| hexane diol diacrylate | 38.2% |
| methacrylated silica | 30% |
| Irgacure 651 | 6.5% |

The ratio of rigid multifunctional monomer to flexible difunctional monomers is 1:7.4.

The coating composition was flow coated onto glass moulds and photocured on exposure to UV light. The glass moulds were assembled and then filled with initiated CR-39 monomer. The CR-39 monomer was cured thermally under standard curing conditions. After curing, the hard coated lenses were removed from the moulds.

The hard coated lenses were then subjected to various ophthalmic lens industry tests. The tests include evaluations for abrasion resistance, adhesion and optical properties. The results are tabulated below:

| Steel Wool Abrasion Resistance | Does Not Scratch |
|---|---|
| Bayer Abrasion Resistance | 3.2 |

Example 2

70 parts polyethylene glycol 400 diacrylate, 30 parts tris (2-hydroxyethyl)isocyanurate triacrylate, 37 parts of methacrylated colloidal silica dispersed in hexane diol diacrylate (commercially available from General Electric), 9 parts Irgacure 651 and 0.6 parts BYK 371 were dissolved in 870 parts methyl acetate.

This makeup procedure gives the following monomer concentrations (as a percentage of solids):

| tris(2-hydroxyethyl)isocyanurate triacrylate | 21.2% |
|---|---|
| polyethylene glycol 400 diacrylate | 49.5% |
| hexane diol diacrylate | 12.7% |
| methacrylated silica | 10% |
| Irgacure 651 | 6.5% |

The ratio of rigid multifunctional monomers to flexible difunctional monomer is 1:2.9.

The coating composition was flow coated onto glass moulds and photocured by exposure to UV light. The glass moulds were assembled and then filled with initiated CR-39 monomer. The CR-39 monomer was cured thermally under standard curing conditions. After curing, the hard coated lenses were removed from the moulds.

The hard coated lenses were then subjected to various ophthalmic lens industry tests. These tests include evaluation for abrasion resistance, adhesion and optical properties. The results are tabulated below:

| Steel Wool Abrasion Resistance | 8.8 |
|---|---|
| Bayer Abrasion Resistance | 3.7 |

Example 3

70 parts polyethylene glycol 400 diacrylate, 30 parts U6HA (a hexafunctional urethane (meth)acrylate monomer available from Shin Nakamura), 108.4 parts of methacrylated colloidal silica dispersed in hexane diol diacrylate (commercially available from General Electric), 13.6 parts Irgacure 651 and 0.9 parts BYK 371 were dissolved in 1350 parts methyl acetate.

This makeup procedure gives the following monomer concentrations (as a percentage of solids):

| U6HA | 14.4% |
|---|---|
| polyethylene glycol 400 diacrylate | 33.5% |
| hexane diol diacrylate | 25.6% |
| methacrylated silica | 20% |
| Irgacure 651 | 6.5% |

The ratio of rigid multifunctional monomers to flexible difunctional monomer is 1:4.1.

The coating composition was flow coated onto glass moulds and photocured by exposure to UV light. The glass moulds were assembled and then filled with initiated CR-39 monomer. The CR-39 monomer was cured thermally under standard curing conditions. After curing, the hard coated lenses were removed from the moulds.

The hard coated lenses were then subjected to various ophthalmic lens industry tests. These tests include evaluation for abrasion resistance, adhesion and optical properties. The results are tabulated below:

| Steel Wool Abrasion Resistance | 6.0 |
|---|---|
| Bayer Abrasion Resistance | 3.8 |

Example 4

73 parts polyethylene glycol 400 diacrylate, 7 parts tris(2-hydroxyethyl)isocyanurate triacrylate, 20 parts pentaerythritol tetraacrylate, 7 parts Irgacure 651 and 0.4 parts BYK 371 were dissolved in 660 parts methyl acetate.

This makeup procedure gives the following monomer concentrations (as a percentage of solids):

| tris(2-hydroxyethyl)isocyanurate triacrylate | 6.6% |
|---|---|
| pentaerythritol tetraacrylate | 18.7% |
| polyethylene glycol 400 diacrylate | 68.2% |
| Irgacure 651 | 6.5% |

The ratio of rigid multifunctional monomers to flexible difunctional monomer is 1:2.7.

The coating composition was flow coated onto glass moulds and photocured by exposure to UV light. The glass moulds were assembled and then filled with initiated CR-39 monomer. The CR-39 monomer was cured thermally under standard curing conditions. After curing, the hard coated lenses were removed from the moulds.

The hard coated lenses were then subjected to various ophthalmic lens industry tests. These tests include evaluation for abrasion resistance, adhesion and optical properties. The results are tabulated below:

| Steel Wool Abrasion Resistance | 9.4 |
|---|---|
| Bayer Abrasion Resistance | 3.9 |

Example 5

71.5 parts polyethylene glycol 400 diacrylate, 28.5 parts pentaerythritol tetraacrylate, 400 parts of methacrylated colloidal silica dispersed in A400, 20.5 parts Irgacure 651 and 1.6 parts BYK 371 were dissolved in 2400 parts methyl acetate.

This makeup procedure gives the following monomer concentrations (as a percentage of solids):

| pentaerythritol tetraacrylate | 17.6% |
|---|---|
| polyethylene glycol 400 diacrylate | 37.4% |
| methacrylated silica | 40% |
| Irgacure 651 | 5.0% |

The ratio of rigid multifunctional monomers to flexible difunctional monomer is 1:2.125.

The coating composition was flow coated onto glass moulds and photocured by exposure to UV light. The glass moulds were assembled and then filled initiated CR-39 monomer. The CR-39 monomer was cured thermally under standard curing conditions. After curing, the hard coated lenses were removed from the moulds.

The hard coated lenses were then subjected to various ophthalmic lens industry tests. These tests include evaluation for abrasion resistance, adhesion and optical properties. The results are tabulated below:

| | |
|---|---|
| Steel wool abrasion resistance | 95 |
| Bayer abrasion resistance | 3.8 |

Finally, it will be appreciated that other variations and modifications may be made to the compositions and methods described herein without departing from the scope of the invention.

The invention claimed is:

1. A method of forming an abrasion resistant coating on an ophthalmic lens, the method comprising:
    coating the ophthalmic lens with a composition comprising (a) a rigid multifunctional monomer, (b) a flexible difunctional monomer, and (c) colloidal silica,
    wherein the rigid multifunctional monomer (a) is a monomer having two or more functional groups bonded to a rigid backbone which yields a polymer having a glass transition temperature of greater than about 130° C. when homopolymerised, and
    wherein the flexible difunctional monomer (b) is a difunctional polyoxyalkylene monomer having an average of four or more oxyalkylene units and at least two functional groups joined by a relatively flexible backbone that yields a polymer having a glass transition temperature of less than about 40° C. when homopolymerised; and
    polymerising the coating comprising copolymerizing the rigid multifunctional monomer (a) with the flexible difunctional monomer (b) to form an abrasion resistant coating on the ophthalmic lens; and
    wherein the weight ratio of rigid multifunctional monomer to flexible difunctional monomer in the composition is between about 1:19 and about 1:2.125.

2. The method of forming an abrasion resistant coating on an ophthalmic lens according to claim 1, wherein the difunctional polyoxyalkylene monomer is a polyoxyethylene.

3. The method of forming an abrasion resistant coating on an ophthalmic lens according to claim 1, wherein the functional groups on the difunctional polyoxyalkylene monomer are acrylate or methacrylate groups.

4. The method of forming an abrasion resistant coating on an ophthalmic lens according to claim 3, wherein the difunctional polyoxyalkylene monomer is selected from one or more of polyethylene glycol 200 diacrylate, polyethylene glycol 400 diacrylate, and polyethylene glycol 600 diacrylate.

5. The method of forming an abrasion resistant coating on an ophthalmic lens according to claim 3, wherein the difunctional polyoxyalkylene monomer is selected from one or more of polyethylene glycol 200 dimethacrylate, polyethylene glycol 400 dimethacrylate and polyethylene glycol 600 dimethacrylate.

6. The method of forming an abrasion resistant coating on an ophthalmic lens according to claim 1, wherein the rigid multifunctional monomer contains three or more functional groups.

7. The method of fowling an abrasion resistant coating on an ophthalmic lens according to claim 6, wherein the functional groups are acrylate or methacrylate.

8. The method of forming an abrasion resistant coating on an ophthalmic lens according to claim 7, wherein the rigid backbone of the multifunctional monomer contains 5, 6 and 7 membered aromatic or aliphatic cyclic or heterocyclic rings.

9. The method of forming an abrasion resistant coating on an ophthalmic lens according to claim 8, wherein the rigid multifunctional monomers is selected from one or more of: pentaerythritol tetraacrylate, tris(2-hydroxyethyl)isocyanurate tri(meth)acrylate, tris(2-hydroxyethyl)isocyanurate di(meth)acrylate, trimethylol propyl triacrylate, dipentaerythritol hexaacrylate, dipentaerythritol pentaacrylate, 2,2,4,4,6,6-hexahydro-2,2,4,4,6,6-hexakis(2-(2-methyl-1-oxo-2-propenypoxy)ethoxy)-1,3,5,2,4,6-triazatriphosphorine, hexafunctional urethane (meth)acrylate, pentafunctional urethane (meth)acrylate, tetrafunctional urethane (meth)acrylate, tricyclodecane dimethanol diacrylate and tris(2-hydroxyethyl)isocyanurate diacrylate.

10. The method of forming an abrasion resistant coating according to claim 1, wherein the ophthalmic lens is coated with the coating using an in-mould coating process.

11. The method of forming an abrasion resistant coating according to claim 10, wherein a mould surface is coated with the composition and the composition is then polymerised or partially polymerised on the mould prior to the mould being assembled and the ophthalmic lens cast.

12. The method of forming an abrasion resistant coating according to claim 11, wherein all or part of any of the surfaces of the ophthalmic lens are coated.

* * * * *